Patented Mar. 28, 1939

2,152,306

UNITED STATES PATENT OFFICE 2,152,306

METHOD OF REMOVING METAL OBSTRUCTIONS FROM WELLS

John J. Grebe and Sylvia M. Stoesser, Midland, Mich., assignors to The Dow Chemical Company, Midland, Mich., a corporation of Michigan No Drawing. Application September 30, 1936, Serial No. 103,360

2 Claims. (Cl. 166—21)

The invention relates to methods of removing metal objects from deep wells. It more particularly concerns an improved method of removing metallic obstructions, such as stuck or lost drilling tools or the like, from a well bore into which a chemical reagent is introduced to act upon and disintegrate or dissolve the metal.

Heretofore it has been proposed to introduce into the well bore an acid solution such as hydrochloric or nitric or mixtures of these acids to dissolve or disintegrate metal objects instead of resorting to a mechanical fishing operation. In many instances a conventional fishing operation will suffice to remove lost tools, steel cable, and the like. Occasionally, however, fishing problems are encountered which cannot be solved by usual mechanical methods and the well may have to be abandoned unless the obstructions can be removed with acids or explosives. Explosives leave much to be desired since their use generally necessitates removing the casing and the result of their action may be, and often is, more or less uncertain or even destructive. The acid solutions heretofore proposed for the purpose have the disadvantage of being very slow to act, requiring days or weeks to accomplish their intended purpose. Moreover, because these solutions are slow to act and tend to penetrate into the formation, especially when it contains calcareous matter, a considerable portion of the solution may be wasted before producing sufficient action upon the metal object. Conventional acid solutions, therefore, are not well adapted for use in fishing operations.

The principal object of our invention is to provide a method of removing metallic objects in deep wells by bringing into contact therewith an aqueous solution characterized by its ability to dissolve or disintegrate the metal with great rapidity so that a metallic obstruction may be dissolved or disintegrated before a considerable loss of solution into the formation occurs. By our method a smaller volume of solution suffices to dissolve rapidly a metal object, effecting a very considerable saving in time over the conventional mechanical fishing methods. We have found that by bringing into contact with the metal object an aqueous solution containing a mixture of hydrochloric acid, nitric acid, and copper chloride, as by introducing the solution into the bore, the dissolving action on metal is much more rapid than that of a solution of hydrochloric or nitric acid or mixture of these acids so that loss of solution into the formation is greatly reduced. The invention, then, consists of the method hereinafter fully described and particularly pointed out in the claims.

In carrying out our invention an aqueous solution containing both hydrochloric and nitric acid and copper chloride in solution is brought into contact in the well bore with the metal object to be attacked and dissolved. The range of effective concentration of the solution over which rapid dissolving action obtains is from 22 to 35 per cent of HCl, 2 to 7 per cent of $HNO_3$, and from 1 to 4 per cent of $CuCl_2$. A generally suitable solution is one containing about 28 per cent of HCl, 5 per cent of nitric acid, and 2 per cent of $CuCl_2$. In removing a lost tool, for example, according to our method, the solution is introduced into the bore in amount sufficient to submerge the metal object to be removed, the solution being lowered into the bore by means of a rubber-lined dump bailer, rubber hose, or similar device, resistant to attack by the solution. The solution is allowed to remain in contact long enough to disintegrate or dissolve the object completely or to an extent sufficient to permit its easy removal by a fishing operation.

After the solution has completed its action upon the object at least to the extent sufficient to permit its removal from the well, it is desirable to introduce into the well a neutralizing solution which will prevent further action and permit the more or less spent solution to be withdrawn by bailing or pumping without material detrimental action upon such equipment. To accomplish this we introduce into the bore an alkaline solution, such as sodium carbonate or hydroxide, in amount sufficient to convert the remaining acids and copper chloride into neutral salts and copper carbonate or hydroxide, respectively, which remains in suspension in the neutralized solution and can be bailed or pumped from the well bore.

By the foregoing method metallic objects composed of iron or steel or the like may be disintegrated in a comparatively short time or so far dissolved as to reduce their size, greatly facilitating their removal by conventional fishing operations. The rapid dissolving action upon the metal makes it possible to dissolve metal with greatly reduced loss of solution into the formation.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method of removing a metal obstruction from the bore of a well, the step which consists in introducing into the well an aqueous solution consisting of from 22 to 35 per cent of HCl, from 2 to 7 per cent of $HNO_3$, and 1 to 4 per cent of $CuCl_2$, the balance being water.

2. In a method of removing a metal obstruction from the bore of a well, the step which consists in introducing into the well an aqueous solution consisting of 28 per cent of HCl, 5 per cent of $HNO_3$, and 2 per cent of $CuCl_2$, the balance being water.

JOHN J. GREBE.
SYLVIA M. STOESSER.